US007617460B2

(12) United States Patent
Katoh et al.

(10) Patent No.: US 7,617,460 B2
(45) Date of Patent: Nov. 10, 2009

(54) DISPLAY DEVICE, CONTROL METHOD AND PROGRAM PRODUCT

(75) Inventors: Kazuko Katoh, Yamato (JP); Atsushi Nishio, Sagamihara (JP); Tetsuo Morimura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 11/299,221

(22) Filed: Dec. 9, 2005

(65) Prior Publication Data

US 2006/0129930 A1 Jun. 15, 2006

(30) Foreign Application Priority Data

Dec. 9, 2004 (JP) ............................ 2004-357256

(51) Int. Cl.
*G06F 3/048* (2006.01)

(52) U.S. Cl. ...................................... 715/764; 715/811

(58) Field of Classification Search ................. 715/811, 715/764

See application file for complete search history.

(56) References Cited

FOREIGN PATENT DOCUMENTS

| | | |
|---|---|---|
| JP | 2039346 | 2/1990 |
| JP | 4052730 | 2/1992 |
| JP | 4181457 | 6/1992 |
| JP | 4199325 | 7/1992 |
| JP | 4205138 | 7/1992 |
| JP | 4252325 | 9/1992 |
| JP | 05288561 | 11/1993 |
| JP | 7160462 | 6/1995 |
| JP | 07-219754 | 8/1995 |
| JP | 7234861 | 9/1995 |
| JP | 8129474 | 5/1996 |
| JP | 8255068 | 10/1996 |
| JP | 9144945 | 9/1997 |
| JP | 10149246 | 6/1998 |
| JP | 11-045176 | 2/1999 |
| JP | 2000-082065 | 3/2000 |
| JP | 2000175136 | 6/2000 |
| JP | 2002268466 | 9/2002 |
| JP | 2003111157 | 4/2003 |
| JP | 2004272564 | 9/2004 |

*Primary Examiner*—Joshua D Campbell
*Assistant Examiner*—Brandon Parker
(74) *Attorney, Agent, or Firm*—Shimokaji & Associates, P.C.; Jill Poimboef

(57) ABSTRACT

Software optimized to use fewer computer resources provides a more appropriate user interface. The invention provides a display device for displaying a screen specified by an instruction. The display includes a display screen, a display frequency setting and a transitioned destination screen. Display control responds to instructions to set the screen to be displayed. A screen display sequentially displays each of a number of screens in response to a number of instructions. A display frequency for a transition destination screen is set in response to an instruction, and a display control sets a screen that the screen display means displays.

12 Claims, 11 Drawing Sheets

FIG. 3

200

| RULE IDENTIFICATION INFORMATION | ACTION RULE | | | | PERFORMANCE COUNT | VALID | INVALIDATED ACTION RULE |
|---|---|---|---|---|---|---|---|
| | SCREEN IDENTIFICATION INFORMATION | INSTRUCTION | CONDITION | ACTION INFORMATION | | | |
| 1 | 1 | ITEM1 | CURRENTLY RUNNING, SPRING OR SUMMER | DISPLAY SCREEN21 | 92 | O | NO |
| 2 | 1 | ITEM2 | CURRENTLY RUNNING, SPRING OR SUMMER | DISPLAY SCREEN22 | 16 | O | NO |
| 3 | 1 | ITEM3 | CURRENTLY RUNNING, SPRING OR SUMMER | DISPLAY SCREEN23 | 32 | O | NO |
| 4 | 21 | ITEM1 | CURRENTLY RUNNING, SPRING OR SUMMER | DISPLAY SCREEN31 | 25 | O | NO |
| 5 | 21 | ITEM2 | CURRENTLY RUNNING, SPRING OR SUMMER | DISPLAY SCREEN32 | 62 | O | NO |
| 6 | 21 | RETURN | CURRENTLY RUNNING, SPRING OR SUMMER | DISPLAY SCREEN1 | 5 | O | NO |
| 7 | 32 | ITEM1 | CURRENTLY RUNNING, SPRING OR SUMMER | DISPLAY SCREEN42 | 53 | O | NO |
| 8 | 32 | RETURN | CURRENTLY RUNNING, SPRING OR SUMMER | DISPLAY SCREEN32 | 9 | O | NO |
| 9 | 42 | ITEM1 | CURRENTLY RUNNING, SPRING OR SUMMER | OUTPUT SPEECH1 | 45 | O | NO |
| 10 | 42 | RETURN | CURRENTLY RUNNING, SPRING OR SUMMER | DISPLAY SCREEN32 | 8 | O | NO |
| ... | ... | ... | ... | ... | ... | ... | ... |

205-1

205-2

205-N

FIG. 5

200

| RULE IDENTIFICATION INFORMATION | ACTION RULE | | | | PERFORMANCE COUNT | VALID | INVALIDATED ACTION RULE |
|---|---|---|---|---|---|---|---|
| | SCREEN IDENTIFICATION INFORMATION | INSTRUCTION | CONDITION | ACTION INFORMATION | | | |
| 1 | 1 | ITEM1 | CURRENTLY RUNNING, SPRING OR SUMMER | DISPLAY SCREEN21 | 0 | X | NO |
| 2 | 1 | ITEM2 | CURRENTLY RUNNING, SPRING OR SUMMER | DISPLAY SCREEN22 | 0 | O | NO |
| 3 | 1 | ITEM3 | CURRENTLY RUNNING, SPRING OR SUMMER | DISPLAY SCREEN23 | 0 | O | NO |
| 4 | 21 | ITEM1 | CURRENTLY RUNNING, SPRING OR SUMMER | DISPLAY SCREEN31 | 0 | O | NO |
| 5 | 21 | ITEM2 | CURRENTLY RUNNING, SPRING OR SUMMER | DISPLAY SCREEN32 | 0 | O | NO |
| 6 | 21 | RETURN | CURRENTLY RUNNING, SPRING OR SUMMER | DISPLAY SCREEN1 | 0 | O | NO |
| 7 | 32 | ITEM1 | CURRENTLY RUNNING, SPRING OR SUMMER | DISPLAY SCREEN42 | 0 | O | NO |
| 8 | 32 | RETURN | CURRENTLY RUNNING, SPRING OR SUMMER | DISPLAY SCREEN32 | 0 | O | NO |
| 9 | 42 | ITEM1 | CURRENTLY RUNNING, SPRING OR SUMMER | OUTPUT SPEECH1 | 0 | O | NO |
| 10 | 42 | RETURN | CURRENTLY RUNNING, SPRING OR SUMMER | DISPLAY SCREEN32 | 0 | O | NO |
| 11 | 1 | ITEM1 | CURRENTLY RUNNING, SPRING OR SUMMER | DISPLAY SCREEN42 | 0 | O | 1 |
| ... | ... | ... | ... | ... | ... | ... | ... |

205-1

205-2

205-N

200a

| SCREEN IDENTIFICATION INFORMATION | INPUT | ... | ACTION INFORMATION | ... |
|---|---|---|---|---|
| 1 | GASOLINE STATION | ... | DISPLAY OF SCREEN21 | ... |
| 21 | XX PETRO | ... | DISPLAY OF SCREEN32 | ... |

200b

| SCREEN IDENTIFICATION INFORMATION | INPUT | ... | ACTION INFORMATION | ... |
|---|---|---|---|---|
| 1 | GASOLINE STATION | ... | DISPLAY OF SCREEN32 | ... |

200a

| SCREEN IDENTIFICATION INFORMATION | INPUT | ... | ACTION INFORMATION | ... |
|---|---|---|---|---|
| 1 | AREA A | ... | DISPLAY SCREEN21 | ... |
| 21 | XX BYPASS | ... | DISPLAY SCREEN32 | ... |

200b

| SCREEN IDENTIFICATION INFORMATION | INPUT | ... | ACTION INFORMATION | ... |
|---|---|---|---|---|
| 1 | AREA A | ... | DISPLAY SCREEN32 | ... |

DISPLAY DEVICE, CONTROL METHOD AND PROGRAM PRODUCT

FIELD OF THE INVENTION

The present invention relates to a display device, and a control method and a program product therefor. Particularly, the present invention relates to a display device that, in response to an instruction input during the display of a screen, displays the next screen designated by the instruction, and a control method and a program product therefor.

BACKGROUND ART

In recent years, car navigation systems or digital home appliances have been in widespread use. These products are in a situation where new models are being developed in succession in the midst of competition in product development and it is required to develop new models having new functions in the shortest possible development period. In these products, however, generally there are a lot of limits to computer resources, and therefore dedicated embedded software is often developed for each product. Accordingly, in the present circumstances, a certain amount of development period and that of development cost are needed.

Concerning this problem, there has been suggested a technology of improving the efficiency of software development by automatically generating software on the basis of information on a screen definition and a screen transition (See: Japanese Laid-Open Patent Publication (Kokai) No. Hei 7-219754 (1995) and Japanese Laid-Open Patent Publication (Kokai) No. Hei 11-45176 (1999)). According to the technology of the first patent document above, frequently used portions in a screen transition diagram are registered as components so as to improve the efficiency of the development of similar functions. According to the technology of the second patent document, after specifying a set of a plurality of screens strongly related to each other, first, a length of a screen transition necessary for switching the screens is detected. If the length is too long, a path for a screen transition having a shorter length is added. This permits a user to view the strongly-related screens sequentially with very few operations, thereby improving user-friendliness.

In many cases, the above products require complicated operations due to their advanced and sophisticated features, though they are widely used by general users. Therefore, it is expected to provide a screen transition fully adapted to a user's taste or usage. Even if, however, the entire computer resources increase due to an improvement in performance of the embedded hardware, most of them are used for new functions. Therefore, it is often the case that the function of providing a user interface (hereinafter, referred to as UI) need be performed under restrictions of the conventional resources.

SUMMARY OF THE INVENTION

As a general method of providing individual users with an optimum UI, there are the following two methods: (1) Preparing screens for various scenarios and selecting a screen to be used according to a user's taste or usage and (2) Informing the taste and usage of the server and browser-displaying a screen delivered according to them. With these methods, however, the following problems will occur in many cases.

When the method (1) is applied to embedded software, there is a need for previously providing a large quantity of screen definitions or of determinations of conditions, which may lead to insufficient computer resources. When the method (2) is applied to embedded software, stability in a communication condition cannot be secured if the product is installed in a movable body such as an automobile or a portable phone, which may decrease the user-friendliness. Moreover, in order to use a web browser comfortably, a large quantity of computer resources may be necessary in some cases. While it is also possible to apply the technology of the patent document 2 to a developed product, it inappropriately imposes a heavy burden on a general user to make him or her determine whether or not a certain screen is strongly related to other screens and input the result.

Therefore, one objective of the present invention is to provide a display device, and a control method and a program product therefor that can resolve the above shortcomings. This objective can be achieved by a set of the features described in the independent claims of the present invention. The dependent claims of the invention define further advantageous examples for this invention.

To achieve this objective, the present invention provides: a display device for displaying a next screen specified by an instruction input during the display of a screen and in response to the input of the instruction, comprising a screen display means, for sequentially displaying each of a plurality of screens in response to each of a plurality of instructions sequentially input in a condition where only one screen is displayed, a frequency acquiring means, for acquiring a display frequency for a transition destination screen displayed in response to a last instruction of the plurality of instructions, and a display control means for setting a screen that the screen display means displays subsequent to the specified screen to the transition destination screen in response to a first instruction of the plurality of instructions, under a condition wherein the display frequency of the transition destination screen exceeds a predetermined reference frequency; a control method for controlling the display device; and a program product for controlling the display device.

The overview of the present invention does not enumerate all the required features of the present invention, and subcombinations of these features can also constitute the invention.

According to the invention, by using software that is operated by a smaller number of computer resources than previously, a user interface can be altered to obtain a form appropriate for each user.

BRIEF DESCRIPTION OF THE DRAWINGS

FIG. 3 is a diagram showing an example data structure of an action rule storing means.

FIG. 5 is a diagram showing the state wherein an action rule is additionally stored in the action rule storing means.

DETAILED DESCRIPTION

The present invention will now be described while referring to the preferred embodiment of the invention. It should be noted, however, that the present invention is not limited to the following embodiment, and that to achieve the invention, not all the combinations of features explained in the embodiment are always requisite.

Figure 1:
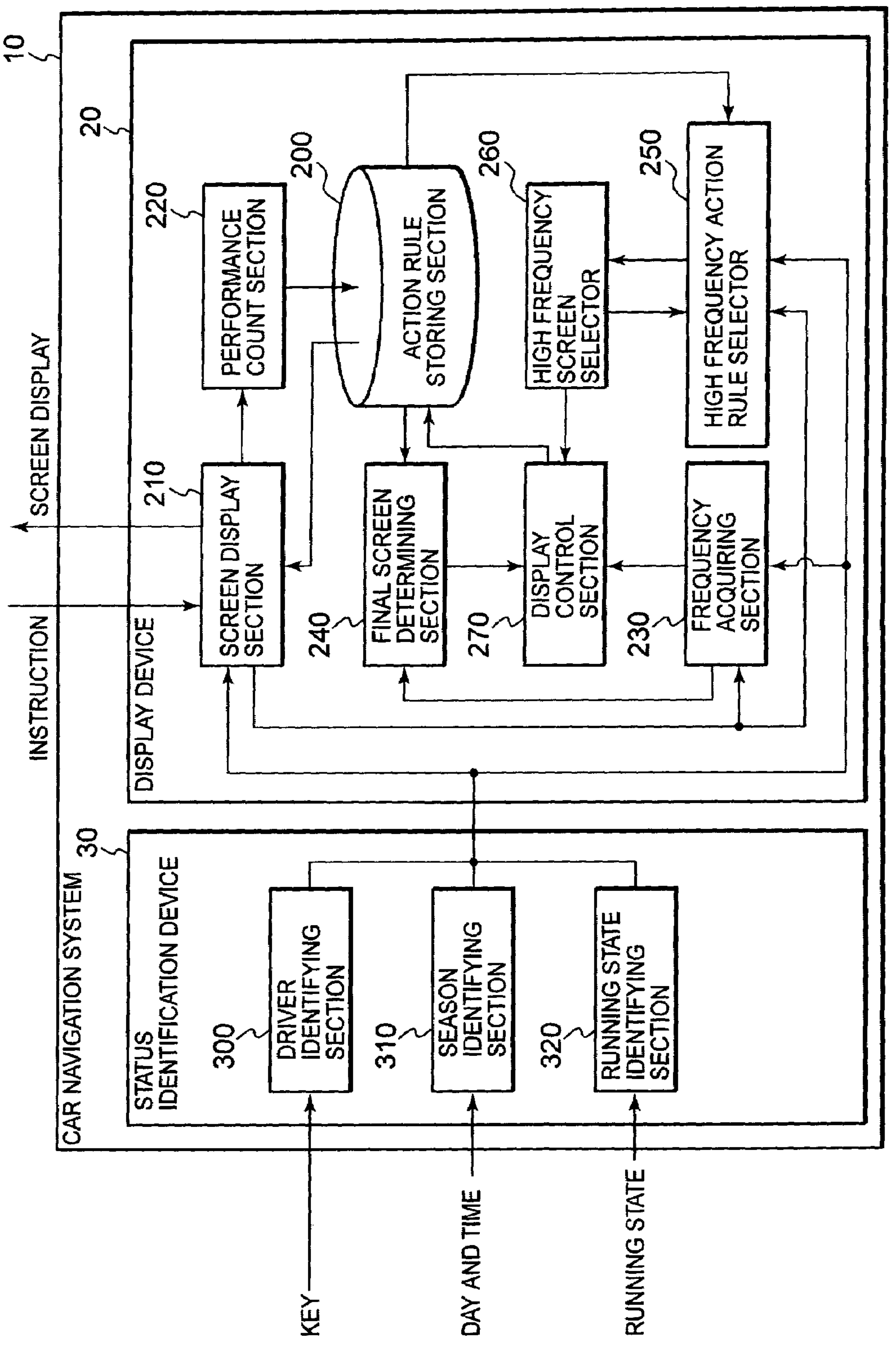
FIG. 1 is a functional block diagram showing a car navigation system.

FIG. 1 is a functional block diagram showing a car navigation system 10. The car navigation system 10 comprises a display device 20 and a status identification device 30. The status identification device 30 obtains the status of an automobile on which the car navigation system 10 is mounted or of the peripheral environment, or the status of the driver of the automobile, and transmits the obtained status to the display device 20. The display device 20 displays a screen based on the status obtained by the status identification device 30, and in response to an instruction input while the screen is displayed, displays the next screen designated by the instruction.

As for a transition destination screen that is displayed after multiple instructions have been sequentially entered following the display of a specific screen, when the display frequency of this transition destination screen is high, the display device 20 displays the transition destination screen only under a condition in which the first instruction is received. As a result, a screen that frequently appears can be displayed using fewer operations, and the usability can be improved.

The status identification device 30 includes a driver identifying means 300, a season identifying means 310 and a running state identifying means 320. The driver identifying means 300 identifies the driver of an automobile on which the car navigation system 10 is mounted. The driver identifying means 300 may identify the driver based on driver identification information that, for example, is prerecorded on a key used to start the engine of the automobile. Either this, or the driver identifying means 300 may identify the driver by using a fingerprint recognition system mounted in the car navigation system 10 or the key, or based on the position and the angle of the driver's seat. The season identifying means 310 obtains a date and time from these management devices, and identifies the current season. The running state identifying means 320 identifies the running state of the automobile based on information obtained by devices that monitor the engine and a running meter.

The display device 20 includes an action rule storing means 200, a screen display means 210, a performance count means 220, a frequency acquiring means 230, a final screen determining means 240, a high frequency action rule selector 250, a high frequency screen selector 260 and a display control means 270. Multiple action rules for sequentially changing screens are stored for individual drivers in the action rule storing means 200. Specifically, for the individual screens that can be displayed by the display device 20, multiple action rules are stored in the action rule storing means 200 and represent a correlation of identification information for identifying screens, instructions entered during the display of the screens and action information for the performance of processes when instructions are input while screens are displayed. Further, in the action rule storing means 200, the number of times processes indicated by the action information and governed by the action rules are performed is stored in correlation with the individual action rules.

The screen display means 210 sequentially displays a plurality of screens in consonance with multiple instructions that are sequentially input when a specific screen is displayed. Specifically, when an instruction is input while a screen is being displayed, the screen display means 210 reads, from the action rule storing means 200, identification information for the screen and action information corresponding to the instruction, and performs the process indicated by the action information. Thus, the next screen can be displayed, and by repeating this process, multiple screens can be sequentially displayed.

Each time a process indicated by specific action information stored in the action rule storing means 200 is performed, the performance count means 220 increments the performance count that is correlated with the action rule including the action information. The frequency acquiring means 230 performs the following processing when a specific screen is displayed by the screen display means 210. It should be noted that, in the following explanation, the specific screen is called a reference screen.

The frequency acquiring means 230 specifies a transition destination screen that is displayed in response to the final instruction of multiple instructions received since the reference screen was displayed. Then, the frequency acquiring means 230 obtains the display frequency of the transition destination screen. For example, the frequency acquiring means 230 may search the action rule storing means 200 to find the action information that indicates a process for displaying the transition destination screen, and may obtain the display frequency by adding together the performance counts of the action rules including the action information. Further, for a driver identified by the driver identifying means 300, the frequency acquiring means 230 may obtain the display frequency of the transition destination screen.

The final screen determining means 240 determines whether the transition destination screen specified by the frequency acquiring means 230 is a screen from which the next new screen will not be displayed even when an instruction is input during displaying of this screen. In this case, the final screen is a screen such that, after the reference screen is displayed, a screen other than the already displayed screen is not to be displayed. That is, the final screen is the one from which screen transition is not performed except when a return instruction for returning to the previously displayed screen is entered.

For the reference screen, from among action rules including the identification information for the reference screen, the high frequency action rule selector 250 selects a high frequency action rule that is correlated with a performance count equal to or greater than a predesignated reference count in the action rule storing means 200. Preferably, based on various states obtained by the status identification device 30, the high frequency action rule selector 250 selects a high frequency action rule from the action rules that are currently available.

As a screen having a high display frequency that is to be displayed next to the reference screen, the high frequency screen selector 260 selects a screen that is displayed by performing a process indicated by the action information included in the high frequency action rule, and transmits the identification information for the selected screen to the display control means 270. The high frequency action rule selector 250 further selects a high frequency action rule for the screen having a high display frequency. The high frequency screen selector 260 selects a screen having a high display frequency that is to be displayed next to the screen having the high display frequency, and transmits identification information for the selected screen to the display control means 270. The above described process is repeated.

The display control means 270 determines whether the display frequency of the transition destination screen exceeds a predesignated reference frequency, and whether the transition destination screen is the final screen and is selected by the high frequency screen selector 260 as a more frequently displayed screen. When the above conditions are established, the display control means 270 designates, as the transition destination screen, a screen that the screen display means 210 is to display following the reference screen in response to the first instruction of multiple instructions.

Specifically, for each driver identified by the driver identifying means 300, the display control means 270 additionally stores, in the action rule storing means 200, an action rule representing a correlation of identification information for the reference screen, the first instruction and a process for displaying the transition destination screen. Then, the display control means 270 invalidates an action rule, in the action rule storing means 200, that includes the identification information for the reference screen and the first instruction and that corresponds to the driver identified by the driver identifying means 300.

Figure 2:
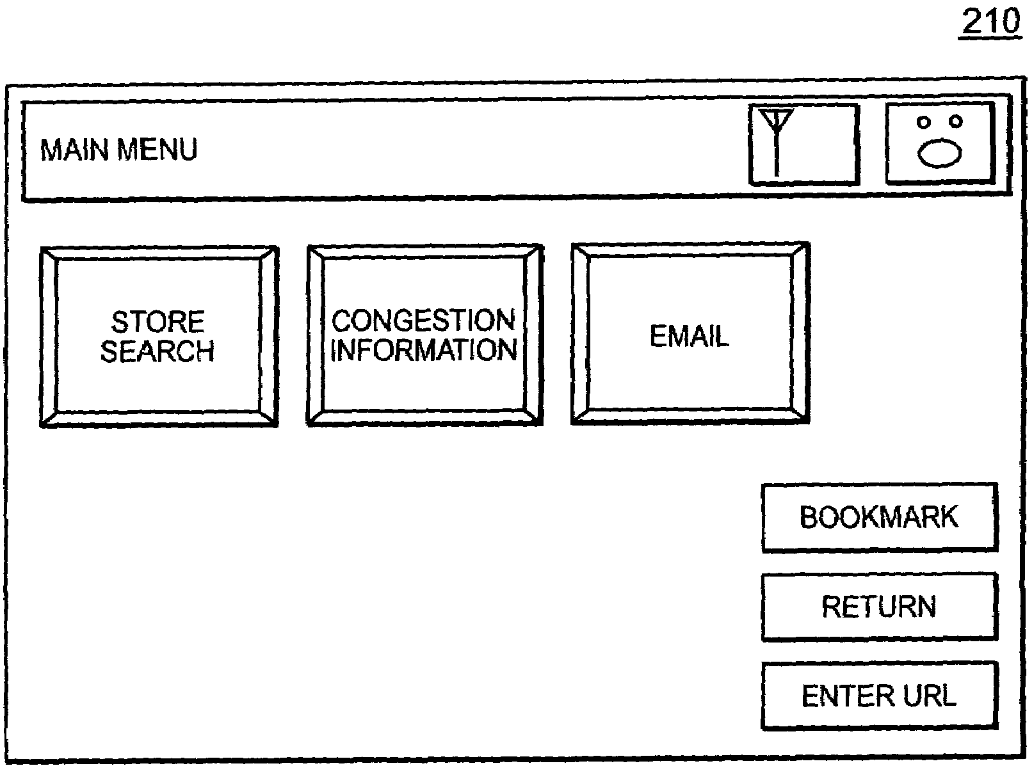
FIG. 2 is a diagram showing an example display presented by a screen display means.

An example display provided by the screen display means 210 is shown in FIG. 2. The screen display means 210 displays, for example, on the screen of a touch panel having a touch sensor, a menu that includes multiple icons indicating entries to be selected. When a user touches a specific icon, the screen display means 210 determines that a specific instruction consonant with that icon has been input. For example, when a user contacts icon "store search", the screen display means 210 determines that an instruction for a store search has been input.

The screen display means 210 also displays icons such as "Bookmark", "Return" and "Enter URL". When a user touches the "Return" icon, for example, the screen display means 210 determines that a return instruction has been input to return the display to the previous screen. The screen display means 210 may also display the state of an electric wave for communication with a radio base station.

As is described above, in this embodiment, an instruction input to the car navigation system 10 is an instruction entered by selecting an icon. Specifically, an instruction is received when a user contacts an icon. Alternately, an instruction for the car navigation system 10 may be entered by moving a cursor to an icon and pressing a button, or by pressing a numbered button corresponding to an icon. Either this, or speech recognition may be employed to determine an instruction has been input by a user.

Moreover, the instruction input type is not limited to the selection of an icon, and may be the depression of a special button provided in advance in accordance with an instruction, or an instruction input type for initiating travel of an automobile, or an instruction input type for starting an engine.

An example data structure for the action rule storing means 200 is shown in FIG. 3. In the action rule storing means 200, action rule groups 205-1 to 205-N, each of which include multiple action rules, are stored for individual drivers. While referring to FIG. 3, to illustrate the use of these action rule groups 205-1 to 205-N, the action rule group 205-1 consonant with a current driver will now be described. The action rule group 205-1 includes, in correlation with rule identification information for identifying an action rule, an action rule, a performance count for the action rule, information indicating whether the action rule is valid, and information indicating an invalidated action rule correlated with a valid action rule.

The action rule includes, at the least, identification information for identifying a screen, an instruction input during the display of the screen, and action information indicating a process performed when the instruction is input during the display of the screen. In FIG. 3, for convenience sake, the phrase representing the contents of the process is shown as action information; actually, however, the action information, for example, is identification information for a function that is called to perform a process.

Further, the action rule preferably includes conditions for the performance of processes indicated by the action rule. For example, the action rule for rule identification information 1 indicates that when an instruction for item 1 is input during the display of screen 1, contingent on the satisfaction of the conditions that an automobile is traveling and the current season is spring or summer, a function for the display of screen 21 is called. The number of times the action rule was performed in the past is 92, in this instance, and the action rule is set to valid.

As described above, in the action rule storing means 200, the individual action rules are stored in correlation with seasons during which these action rules are to be employed. Thus, the screen display means 210 can appropriately perform a screen transition in consonance with a season. Further, the screen display means 210 can count, for each season, the times the individual action rules were applied. As a result, the high frequency action rule selector 250 can select, from among the action rules, a high frequency action rule that can be performed during the current season. And thus, when, for example, a user tends to visit a specific area every season for sightseeing, an appropriate map and route for that area can be quickly displayed in accordance with the season, and the usability can be improved.

Figure 4:
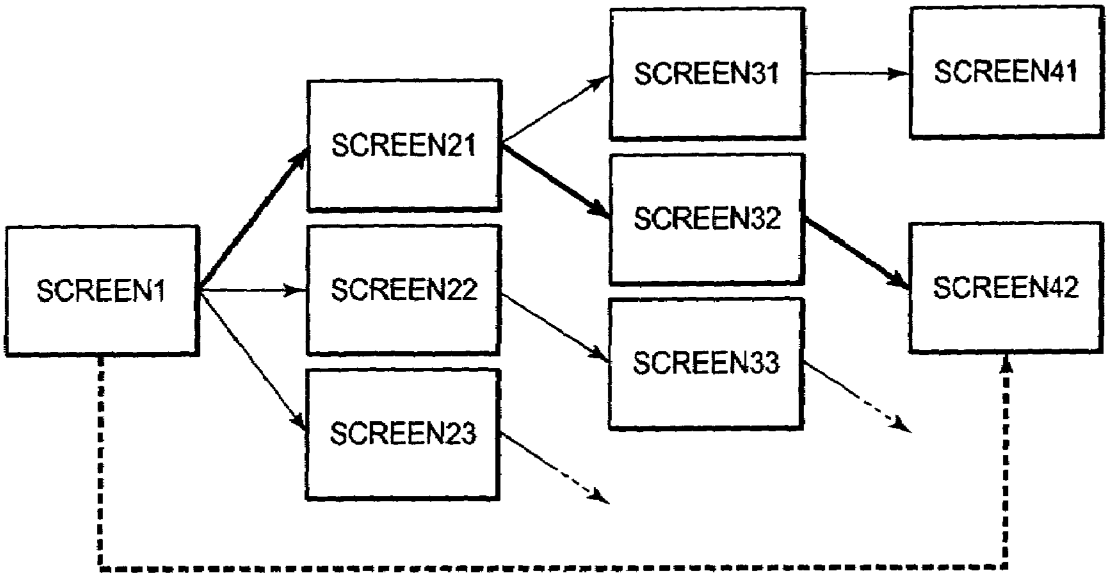
FIG. 4 is a diagram showing the state wherein, in response to an input instruction, a display device displays the next screen designated by the instruction.

FIG. 4 is a diagram showing the state in which, in response to an input instruction, the display device 20 displays the next screen designated by the instruction. When an instruction for item 1 is input while screen 1 is being displayed, the screen display means 210 displays screen 21. If, however, another instruction is input, the screen display means 210 displays screen 22 or screen 23 in response to this instruction. Then, when an instruction for item 2 is input while screen 21 is being displayed, the screen display means 210 displays screen 32. Whereas if another instruction is input, the screen display means 210 displays screen 31. And when a predetermined instruction is input while screen 32 is being displayed, the screen display means 210 displays screen 42.

In FIG. 4, processes performed in accordance with action information included in action rules are indicated by arrows. That is, by performing processes consonant with action information included in individual action rules, screen 21 is displayed following screen 1, screen 32 is displayed following screen 21, and screen 42 is displayed following screen 32. Further, action rules that are correlated with performance counts greater than the reference count are indicated by thick arrows, while action rules that are correlated with performance counts equal to or smaller than the reference count are indicated by fine arrows.

Furthermore, screen 1 in FIG. 4 is an example reference screen, and screen 42 is an example transition destination screen. The reference screen is not limited to the initial screen that is displayed when the car navigation system 10 is powered on or reset; a screen may also be included that is displayed during the display transition after the initial screen is displayed and a specific instruction is input. Further, the transition destination screen is also not limited to a final screen following which a next, new screen is not displayed when a specific instruction is input while the pertinent screen is being displayed, and may be a screen presented during a display transition. That is, the transition destination screen need only be a screen that is displayed after the reference screen has been displayed and multiple instructions have been input. In addition, conceptually, multiple instructions for shifting the reference screen to the transition destination screen include not only all of the instructions that are input before the initial screen is shifted to the final screen, but also the series of multiple, continuous instructions that constitute a part of all the instructions.

While referring to FIGS. 3 and 4, an explanation will be given for the processing performed to set, as the transition destination screen, a screen that the screen display means 210 displays following the reference screen. Assume that screen 1 is a reference screen and screen 42 is a transition destination screen. From among the action rules, which include identification information for screen 1, the high frequency action rule selector 250 selects a high frequency action rule, in the action rule storing means 200, that is correlated with a performance count equal to or greater than the reference count. Since the reference count is 90, the high frequency action rule selector 250 selects a high frequency action rule for rule identification information 1.

Sequentially, the high frequency screen selector 260 selects, as a screen having a high display frequency, a screen that is displayed by performing a process indicated by action information included in the action rule for rule identification information 1. That is, for example, the high frequency screen selector 260 analyzes the action information, determines that screen 21 should be displayed, and selects screen 21. Then, from among action rules that include identification information for screen 21, the high frequency action rule selector 250 selects a high frequency action rule, in the action rule storing means 200, that is correlated with a performance count equal to or greater than the reference count.

For each of the screens that, as screens having high display frequencies, are sequentially selected and are to be displayed following the reference screen, when the turn for the display of the screen following the reference screen is late, a smaller value is employed as a reference count, compared with when the turn for the display is early. That is, in this case, by using a reference count of 60, the high frequency action rule selector 250 selects an action rule for rule identification information 5. The high frequency screen selector 260 selects, as a screen having a high display frequency, a screen that is displayed by performing a process indicated by the action information included in the action rule for the rule identification information 5. That is, the high frequency screen selector 260 selects screen 32.

Next, from among action rules including identification information for screen 32, the high frequency action rule selector 250 selects a high frequency action rule (e.g., an action rule for rule identification information 7), in the action rule storing means 200, that is correlated with a performance count equal to or greater than the reference count (e.g., 30). Then, the high frequency screen selector 260 selects screen 42 as a screen having a high display frequency.

As a result, the display control means 270 determines that screen 42, which is a transition destination screen, is a screen having a high display frequency that was selected by the high frequency screen selector 260. Therefore, the display control means 270 designates, as screen 41, a screen that the screen display means 210 displays following screen 1. As a specific process, the display control means 270 invalidates an action rule that includes screen 1 and item 1 in the action rule storing means 200, and stores in the action rule storing means 200, as an addition, a new action rule representing a correlation of screen 1, item 1 and a process for displaying screen 41.

FIG. 5 is a diagram showing the state in which an action rule is stored, as an addition, in the action rule storing means 200. An action rule for rule identification information 11 is the one newly added. The display control means 270 adds, in consonance with rule identification information 11, an action rule representing a correlation of identification information for screen 1, an instruction for item 1 and action information indicating a process to be performed for display screen 42. Furthermore, the display control means 270 invalidates another action rule, in the action rule storing means 200, that includes identification information for screen 1 and an instruction for item 1. That is, in accordance with the action rule for rule identification information 1, the display control means 270 enters an "X", which indicates that the action rule is invalid.

In this case, the action rule regarded as invalid by the display control means 270 is stored, in the action rule storing means 200, in correlation with another action rule for which the identification information and the instruction for a corresponding screen are the same as those for the invalid action rule. That is, for example, the invalidated action rule for rule identification information 1 is stored, in the action rule storing means 200, in correlation with the action rule for rule identification information 11. Thus, the display control means 270 can, as needed, return the invalidated action rule to its original state, before it was changed.

In addition, preferably when the action rule is at least partially changed, the display control means 270 sets to "0" the performance counts corresponding to all the action rules. Thus, the performance of the action rule that has been changed can be counted, and based on the changed action rule, an alteration can be performed to increase the usability.

Figure 6:
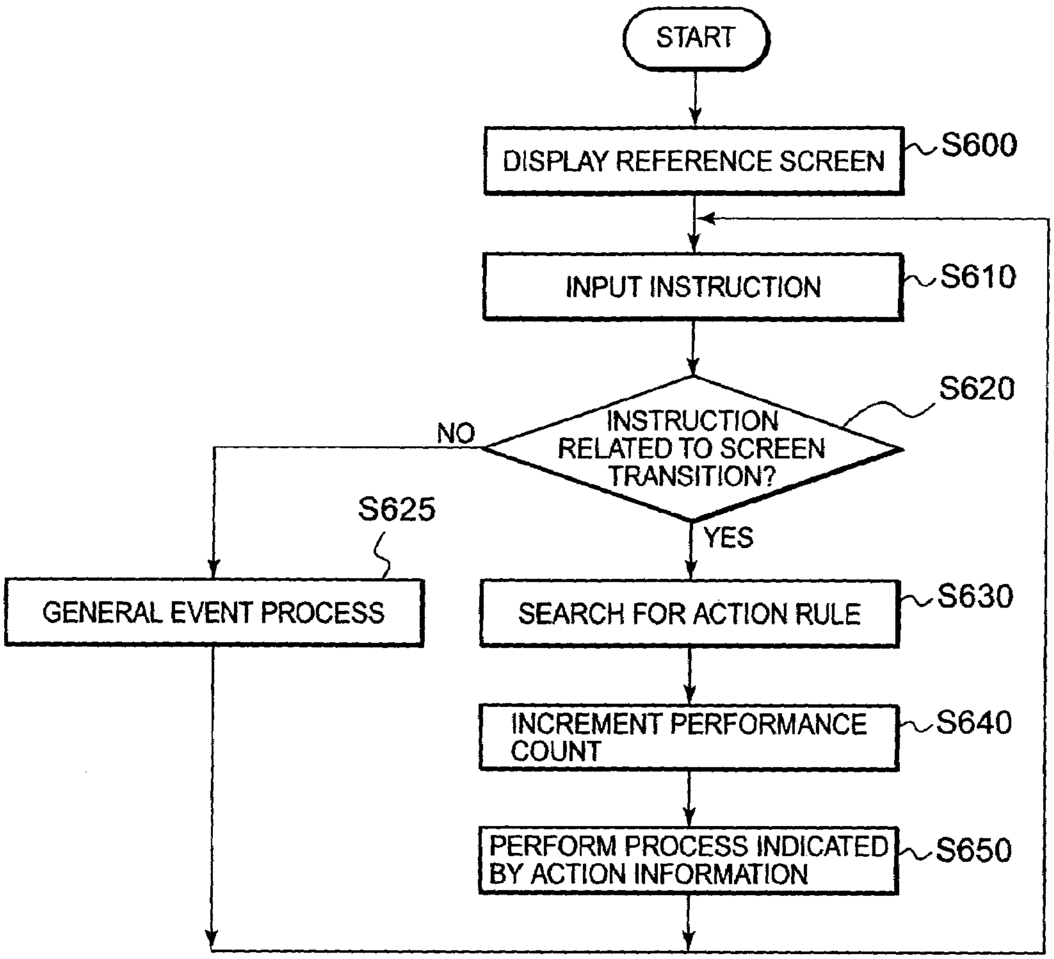
FIG. 6 is a flowchart showing the processing whereby the display device sequentially displays screens in accordance with input instructions.

FIG. 6 is a flowchart showing the processing by which the display device 20 sequentially displays screens in accordance with input instructions. The screen display means 210 displays the reference screen as the initial screen (S600), and while the screen is being displayed, receives an instruction input by a user (S610). The screen display means 210 then determines whether the input instruction is related to screen transition (S620). When, for example, a simple cursor movement instruction is input, the screen display means 210 determines that the instruction is not related to screen transition.

When the input instruction is not related to screen transition (NO: S620), the screen display means 210 performs a general event process (S625). For example, the cursor may be moved on the screen. When the input instruction is related to screen transition (YES: S620), and when the instruction is input while the screen is being displayed, the screen display means 210 searches the action rule storing means 200 to find identification information for the pertinent screen and action information corresponding to the instruction, and reads the information (S630).

Each time a process indicated by specific action information stored in the action rule storing means 200 is performed, the performance count means 220 increments the performance count correlated with an action rule that includes the specific action information (S640). The performance count means 220 performs the process indicated by the action information that has been read (S650).

The above described processing is also performed when a return instruction is input to the screen display means 210. For example, when a return instruction is input while the transition destination is displayed following the reference screen, the transition destination screen is changed to a screen that was displayed immediately before the final instruction for displaying the transition destination screen was input. This process is performed by the action rules that include a return instruction, e.g., as shown in FIG. 3, and action rules for rule identification information 6, 8 and 10.

Figure 7:
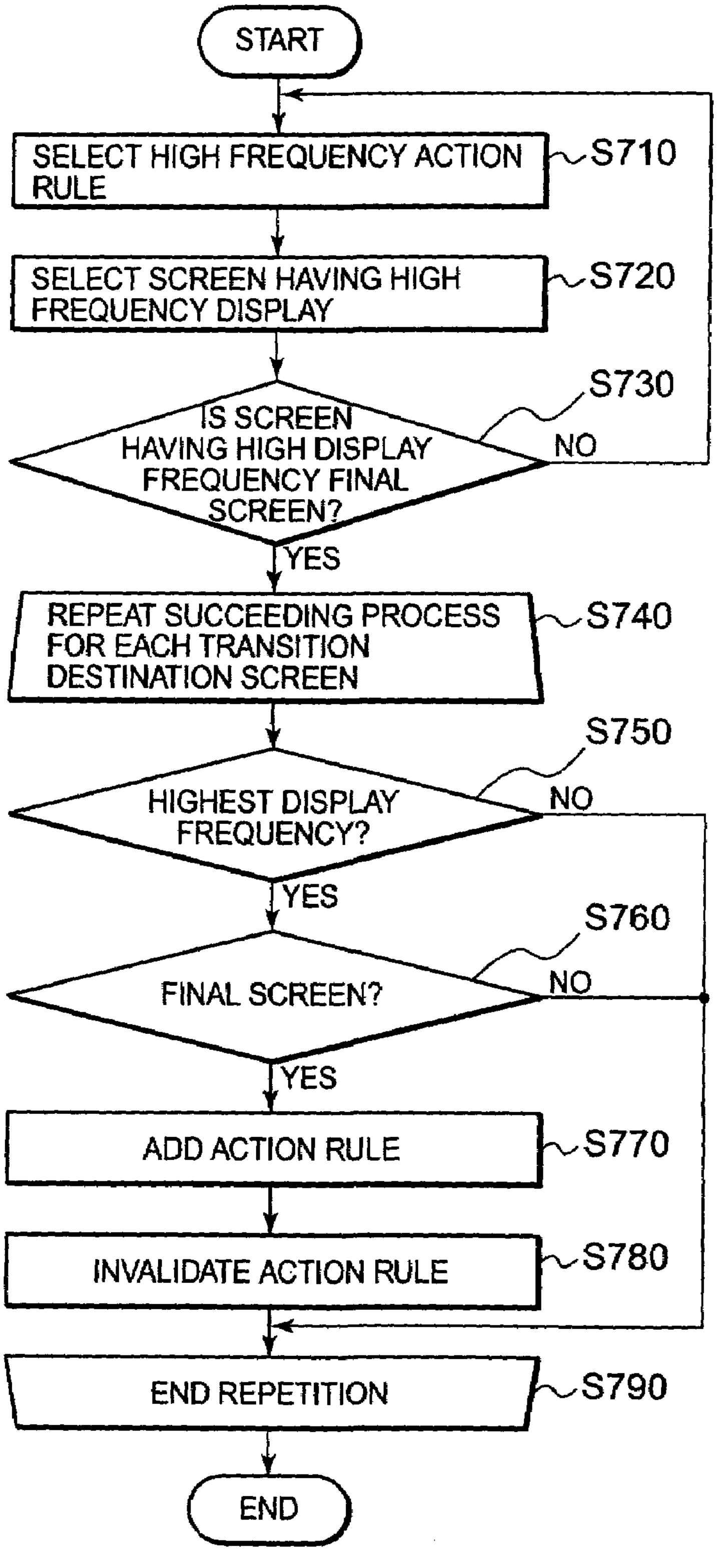
FIG. 7 is a flowchart showing the processing whereby the display device adds an action rule.

FIG. 7 is a flowchart showing the processing by which the display device 20 adds an action rule. Each time the screen display means 210 performs a screen transition, for example, the display device 20 performs the following processing by employing a currently displayed screen as a reference screen. The high frequency action rule selector 250 selects, from among action rules including identification information for the reference screen, a high action rule correlated with a performance count that is equal to or greater than a predesignated reference count in the action rule storing means 200 (S710).

The high frequency screen selector 260 selects, as a screen having a high display frequency that is to be displayed following the reference screen, a screen that is to be displayed by performing a process that is indicated by action information included in the high frequency action rule (S720). When the screen having a high display frequency is not the final screen (NO: S730), the high frequency action rule selector 250 returns the processing to S710, and the processing is repeated. The determination of whether the screen having a high display frequency is the final screen is not requisite, and program control may be shifted to S740, regardless of whether the pertinent screen is the final screen. In this case, the opportunities for changing the screen transition can be increased.

When the screen having a high display frequency is the final screen (YES: S730), the display device 20 repeats the following process for each transition destination screen (S740). The frequency acquiring means 230 obtains the display frequency for each transition destination screen, and determines whether each display frequency is higher than a predesignated reference frequency (S750). The frequency acquiring means 230 may, for example, compare a display frequency with the display frequency of another transition destination screen to determine whether the pertinent display frequency is the highest. When the display frequency is the highest (YES: S750), the final screen determining means 240 determines whether the transition destination screen is the final screen (S760).

The final screen determining means 240, for example, obtains from the action rule storing unit 200 all the action information that corresponds to identification information for the transition destination screen. Then, when none of the obtained action information includes a process for displaying a screen other than the screens that have already been displayed following the reference screen, the final screen determining means 240 determines that the transition destination screen is the final screen.

When the display frequency of the transition destination screen is the highest, and when the transition destination screen is the final screen, the display control means 270 designates, as the transition destination screen, a screen that the screen display unit 210 displays, following the reference screen, in response to the first instruction (S770). Specifically, the display control means 270 additionally stores, in the action rule storing means 200, an action rule that represents a correlation of identification information for the reference screen, the first instruction and action information indicating a process for displaying the transition destination screen. Then, the display control means 270 invalidates another action rule, in the action rule storing means 200, that includes identification information for the reference screen and the first instruction (S780). Thereafter, the display device 20 repeats the above described processing for each transition destination screen (S790).

Instead of this processing, or in addition to this processing, for each screen, information indicating whether the screen is predesignated as a candidate screen to be displayed following the reference screen, may also be stored in the action rule storing means 200. In this case, subject to a condition under which the transition destination screen is the candidate screen, the display control means 270 designates, as the transition destination screen, a screen that the screen display means 210 is to display, in response to the first instruction, following the reference screen. Through this process, since a person who designs action rules can predesignate an appropriate screen to be displayed next to the reference screen, the changing of the action rule exceeding the assumption can be prevented.

Figure 8:
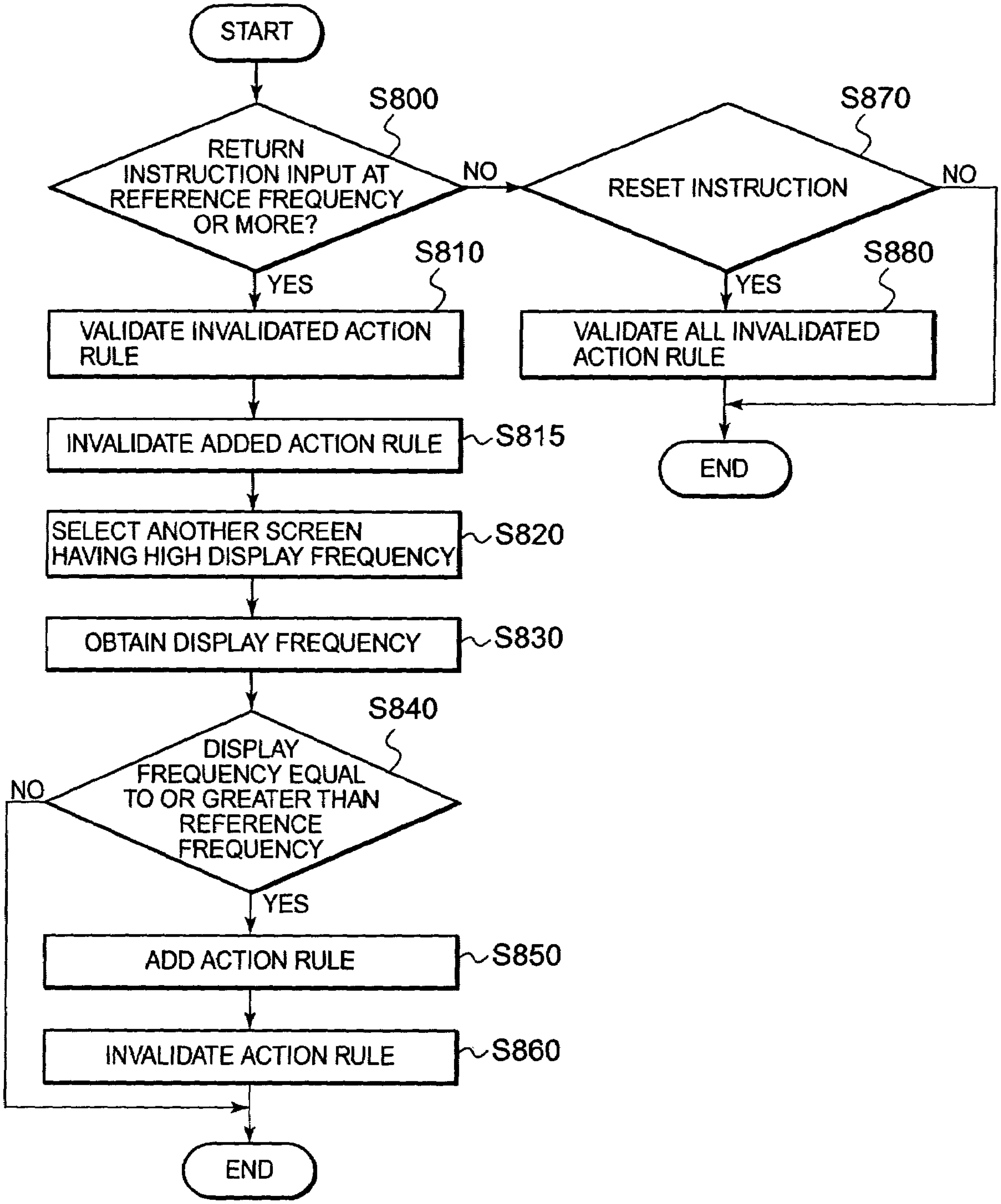
FIG. 8 is a flowchart showing the processing performed by the display device when a return instruction is input.

FIG. 8 is a flowchart showing the processing performed when a return instruction is input to the display device 20. Upon receiving a return instruction, the display device 20 performs the processing shown in FIG. 8, as well as the processing in FIG. 6. First, the display control means 270 determines whether a frequency at which the return instruction was input, while the transition destination screen was displayed following the reference screen, is equal to or higher than a reference frequency (S800). When an action rule for screen transition to the transition destination screen that is currently displayed is recorded, the display control means 270 can determine whether the transition destination screen currently displayed is the one displayed next to the reference screen. Further, whether the displayed screen is the transition destination screen that was shifted from the reference screen can be determined based on the performance count in the action rule that includes the return instruction.

When the frequency at which the return instruction was input is equal to or higher than the reference frequency (YES: S800), the display control means 270 validates the invalidated action rule, in the action rule storing means 200, that includes the reference screen (S810). Thereafter, the display control means 270 invalidates another action rule, in the action rule storing means 200, for which the identification information for the screen and the instruction are the same as the invalidated action rule (S815).

In this case, for other multiple instructions that differ from multiple instructions for displaying the transition destination screen, the frequency acquiring means 230 selects a different transition destination screen that is to be displayed in consonance with the last instruction among the other multiple instructions (S820). For example, the frequency acquiring means 230 may obtain, as the different transition destination screen, a screen, other than the transition destination screen, having the highest display frequency. Then, the frequency acquiring means 230 obtains the display frequency of the different transition destination screen (S830).

When the display frequency is lower than the reference frequency (NO: S840), the display control means 270 terminates the processing. Through this processing, even if the setup for displaying a transition destination screen following the reference screen has been performed, this setup can be invalidated when another screen is frequently displayed.

When the display frequency is equal to or higher than the reference frequency (YES: S840), the display control means 270 adds an action rule for displaying the different transition destination screen next to the reference screen (S850). Following this, the display control means 270 invalidates an action rule that includes image identification information for the reference screen and the first instruction of the multiple different instructions (S860). As a result, when the different transition destination screen is displayed frequently, not only is the setup invalidated, but also the setup can be changed, and a different transition destination screen can be easily displayed.

When the frequency at which the return instruction was input is lower than the reference frequency (NO: S800), the display control means 270 determines whether a reset instruction has been input to return the action rule to the state that existed before it was changed (S870). When the reset instruction is input (YES: S870), the display control means 270 validates all the invalidated action rules in the action rule storing means 200, and invalidates other action rules that are stored in the action rule storing means 200 in correlation with these invalidated action rules (S880). Through this process, when the user does not desire to change the action rule, the action rule can be returned to its original state.

As explained while referring to FIGS. 1 to 8, according to the display device 20 of the embodiment, since an action rule that is seldom employed is invalidated, the display of a screen having a high display frequency can be more easily performed than can the display of other screens. Thus, a screen that is frequently displayed can be presented by employing only a few operations, and the usability can be improved.

Figures 9A, 9B:
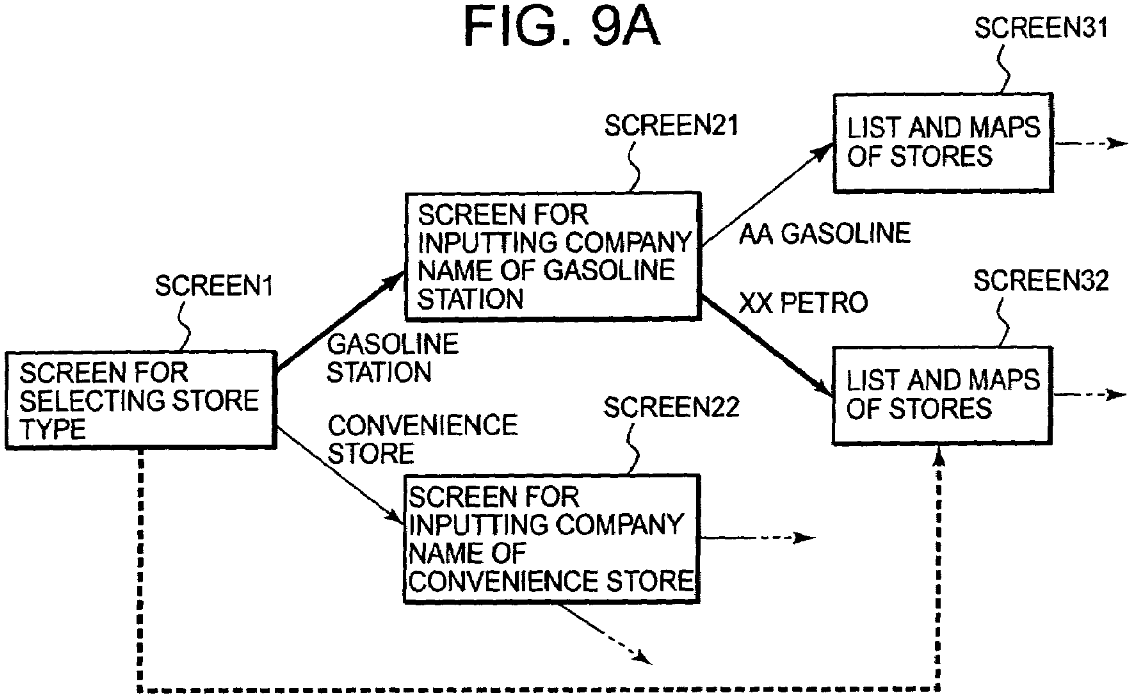
FIGS. 9A and 9B are diagrams showing an example wherein the car navigation system according to the embodiment is applied for a store search.

An example in which the car navigation system 10 of this embodiment is applied for a storage search is shown in FIGS. 9A and 9B. As shown in FIG. 9A, when an instruction that designates a gasoline station is input to a screen 1 for selecting a store type, the screen display means 210 displays screen 21 for inputting the name of the company of the gasoline station. And when an instruction that designates a convenience store is input to the screen 1, the screen display means 210 displays a screen 22 for inputting the name of the company of the convenience store.

When an instruction that designates the company name "AA Gasoline" is input to the screen 21, the screen display means 210 displays a screen 31 that shows a list and maps for the AA Gasoline gasoline stations. And when an instruction designating the company name "XX Petro" is input to the screen 21, the screen display means 210 displays a screen 32 that shows a list and maps for the XX Petro gasoline stations.

The frequency acquiring means 230 obtains the display frequency for a transition destination screen, the display frequency for the screen that shows the list of stores and that is displayed following the screen 1 in response to the instruction to designate the store type and the name of the company that manages the stores. For example, the frequency acquiring means 230 obtains the display frequency for the screen 32.

Thereafter, under a condition in which the display frequency of the screen 32 exceeds a reference frequency, the display control means 270 designates, as the screen 32 that shows the list of stores and others, a screen that the screen display means 210 displays next to the screen 1 in response to the instruction that designates the store type (see the thick broken line arrow). With this arrangement, when a user frequently searches for the gasoline stations of the same company, the input of the company name is not required and the usability is increased.

Valid action rules in the action rule storing means 200 are shown in FIG. 9B. The state of an action rule storing means 200*a* precedes the addition of an action rule, and the state of an action rule storing means 200*b* follows the addition of an action rule. As is apparent from FIG. 9B, an action rule representing a direct transition from the screen 1 to the screen 32 is added, instead of an action rule representing a transition from the screen 1 to the screen 21 and an action rule representing a transition from the screen 21 to the screen 32.

Figures 10A, 10B:
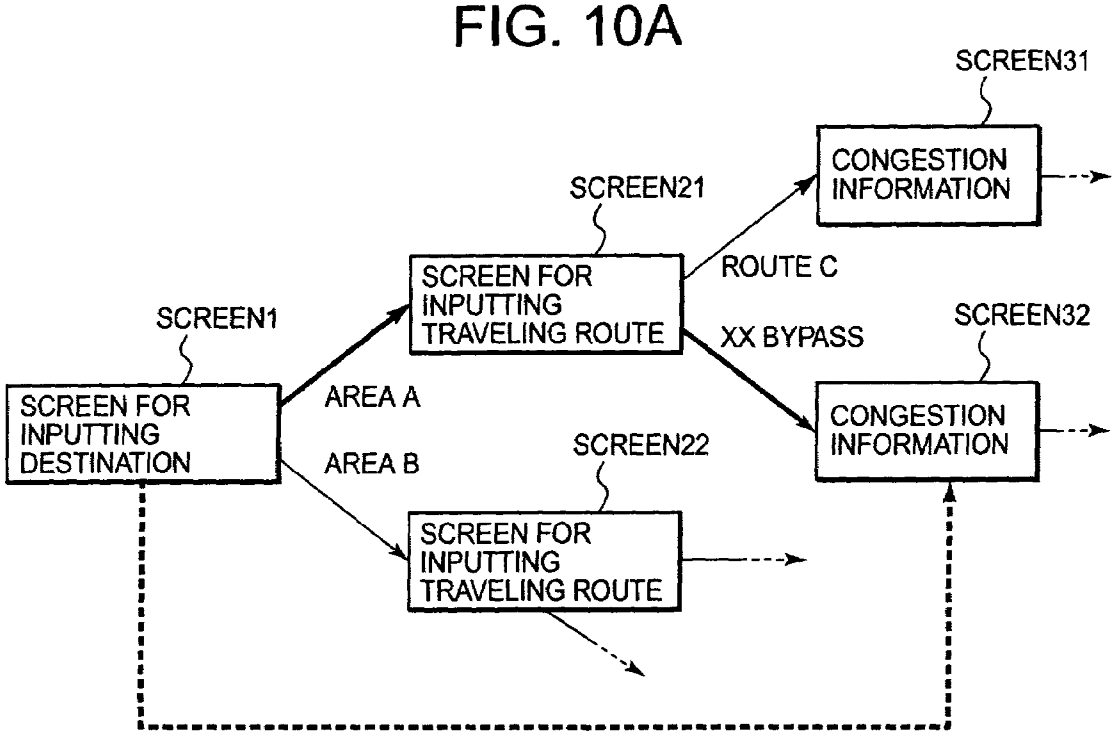
FIGS. 10A and 10B are diagrams showing an example wherein the car navigation system according to the embodiment is applied for a search for congestion information.

An example in which the car navigation system 10 of this embodiment is applied for a search for congestion information is shown in FIGS. 10A and 10B. As shown in FIG. 10A, when an instruction designating an area A is input to a screen 1 for inputting a destination, the screen display means 210 displays a screen 21 that shows the route to be travelled by an automobile to the area A. When an instruction designating an area B is input to the screen 1, the screen display means 210 displays a screen 22 that shows the route to be travelled by the automobile to the area B.

When an instruction is input to the screen 21 that designates a "Route C" as a route to be travelled, the screen display means 20 displays a screen 31 that shows congestion information for the route C. And when an instruction is input to the screen 21 that designates "XX bypass" as the route to be travelled, the screen display means 210 displays a screen 32 that shows congestion information for the XX bypass.

The frequency acquiring means 230 obtains, as the display frequency for a transition destination screen, the display frequency for a screen that shows congestion information for a route to be travelled and that is displayed, following the screen 1, in response to an instruction that designates a destination and an instruction that designates a route to be travelled by an automobile. For example, the frequency display acquiring means 230 obtains the display frequency for the screen 32.

Thereafter, under a condition in which the display frequency of the screen 32 exceeds the reference frequency, the display control means 270 designates, as the screen 32 that shows the congestion information for the route to be travelled, a screen that the screen display means 210 displays following the screen 1 in response to an instruction that designates a destination (see the thick broken line arrow). With this arrangement, when a user frequently searches for congestion information for the same route, since the input of the route is not required, the usability can be improved.

Valid action rules in the action rule storing means 200 are shown in FIG. 10B. The state of an action rule storing means 200*a* precedes the addition of an action rule, and the state of an action rule storing means 200*b* follows the addition of an action rule. As is apparent from FIG. 10B, an action rule representing a direct transition from the screen 1 to the screen 32 is added, instead of an action rule representing a transition from the screen 1 to the screen 21 and an action rule representing a transition from the screen 21 to the screen 32.

Figure 11:
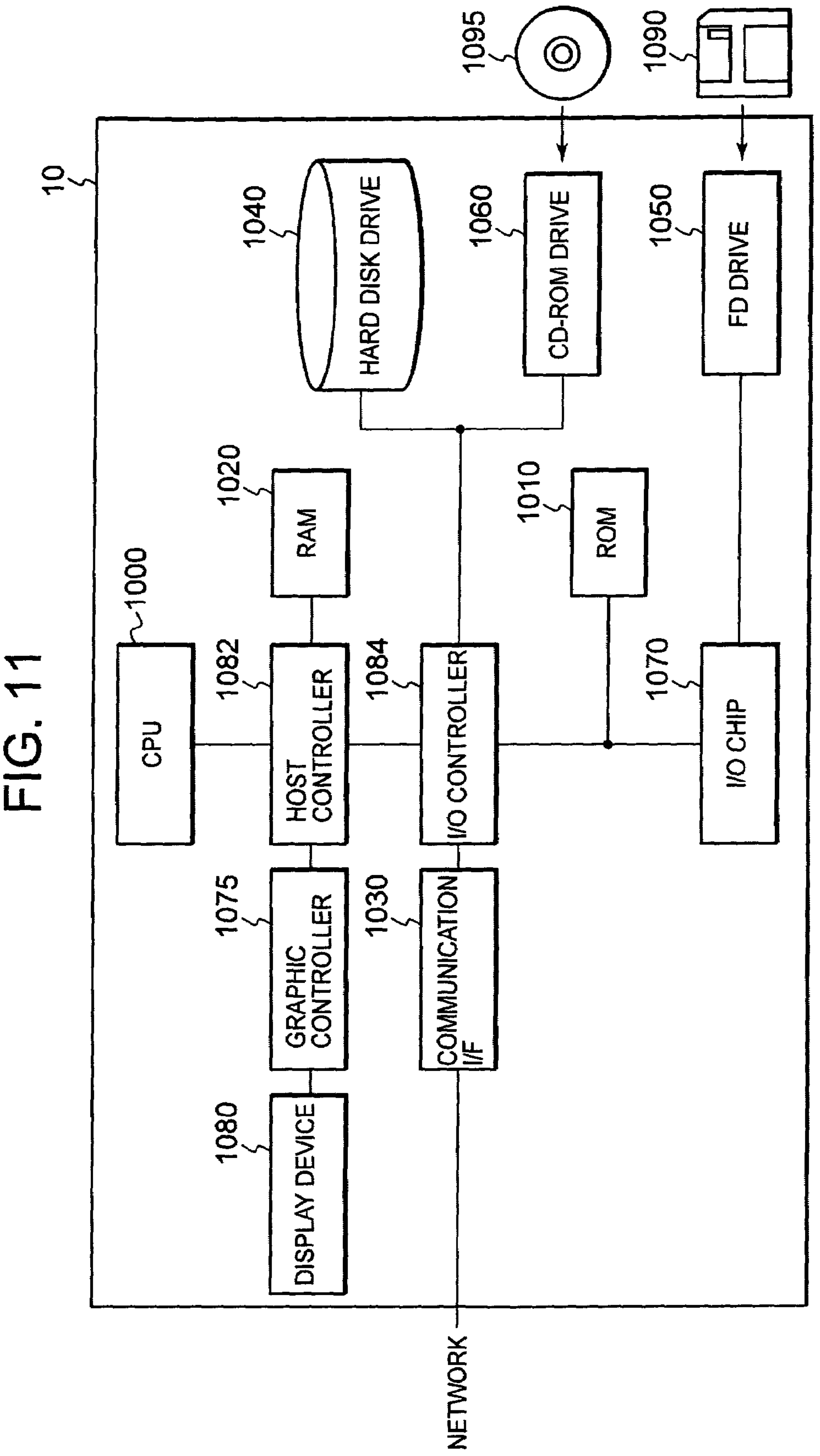
FIG. 11 is a diagram showing an example hardware configuration for the car navigation system.

An example hardware configuration for the car navigation system 10 is shown in FIG. 11. The car navigation system 10 comprises: a CPU peripheral means, including a CPU 1000, a RAM 1020 and a graphic controller 1075, which are mutually connected by a host controller 1082; an input/output means, including a communication interface 1030, a hard disk drive 1040 and a CD-ROM drive 1060, which are connected to the host controller 1082 by an input/output controller 1084; and a legacy input/output means, including a ROM 1010, a flexible disk drive 1050 and an input/output chip 1070, which are connected to the input/output controller 1084.

The host controller 1082 connects the ROM 1020 to the CPU 1000, which accesses the RAM 1020 at a high data transfer rate, and the graphic controller 1075. The CPU 1000 is operated based on programs stored in the ROM 1010 and in the RAM 1020, and controls the individual meanss. The graphic controller 1075 obtains image data that the CPU 1000 generates in a frame buffer provided, for example, in the RAM 1020, and displays the image data on a display device 1080. The graphic controller 1075 may include a frame buffer for storing image data generated, for example, by the CPU 1000.

The input/output controller 1084 is connected to the host controller 1082, the communication interface 1030, which is a comparatively fast input/output device, the hard disk drive 1040 and the CD-ROM drive 1060. The communication interface 1030 communicates with an external device via a network. The hard disk drive 1040 is used to store programs and data used by the car navigation system 10. The CD-ROM drive 1060 reads a program, or data, from a CD-ROM 1095, and provides the program, or the data, to the input/output chip 1070 via the RAM 1020.

The input/output controller 1084 is also connected to the ROM 1010 and comparatively slow input/output devices, such as the flexible disk drive 1050 and the input/output chip 1070. The ROM 1010 is used, for example, to store a boot program that the CPU 1000 executes when the car navigation system 10 is activated, and a program that depends on the hardware of the car navigation system 10. The flexible disk drive 1050 reads a program, or data, from a flexible disk 1090, and provides the program, or the data, to the input/output chip 1070 via the RAM 1020. The input/output chip 1070 is connected to various types of input/output devices via the flexible disk 1090, or via, for example, a parallel port, a serial port, a keyboard port and a mouse port.

A program for the car navigation system 10 is provided for a user by being stored on the flexible disk 1090, the CD-ROM 1095 or a recording medium such as an IC card. The program is read from the recording medium via the input/output chip 1070 and/or the input/output controller 1084, and is installed and executed by the car navigation system 10. Since the operation that the program permits the car navigation system 10 to perform is the same as that explained while referring to FIGS. 1 to 10, no further explanation for it will be given.

The above described program may be stored on an external storage medium. As the storage medium, in addition to the flexible disk 1090 or the CD-ROM 1095, an optical recording medium such as a DVD or a PD, a magneto-optical recording medium such as an MD, a tape medium, or a semiconductor memory such as an IC card can be employed. Further, a storage device, such as a hard disk or a RAM, that is provided in a server system connected to a special communication network or the Internet may be employed as a recording medium, and a program may be provided for the car navigation system 10 via the network.

The present invention has been explained by employing the embodiment; however, the technical scope of the invention is not limited to that described in the embodiment. To one having ordinary skill in the art it will be obvious that various modifications and improvements can be added to the embodiment, and it will also be obvious, from the description of the claims of the invention, that modes based on modifications or improvements can also be included in the technical scope of the invention.

The invention claimed is:

1. A display device for displaying a next screen responsive to instruction input during a current screen display, comprising:

an action rule storing means for storing multiple action rules representing, for each of a plurality of individual screens to be displayed by the display device, correlations of identification information for identifying each of the plurality of individual screens, instructions to be input during the display of each of the plurality of individual screens and action information indicating processes to be performed, and storing the number of times the processes are performed, when instructions are input during the display of each of the plurality of individual screens and wherein, the multiple action rules are stored in correlation with seasons during which the action rules are to be applied;

a season identification information acquiring means for obtaining season identification information for identifying a current season;

a screen display means for displaying a next screen of said current screen, by reading identification information of said current screen and an action information corresponding to a specific instruction when the specific instruction is input during display of said current screen, and by executing the process indicated in said action information, and reading information indicating whether one of the individual screens is predesignated as a candidate screen to be displayed following a reference screen;

a frequency acquiring means for acquiring a display frequency of a transition destination screen displayed in response to a last instruction out of a plurality of instructions, by adding together the performance counts of the action rules, in the case that said display unit sequentially displays a plurality of screens corresponding to the plurality of instructions, which are sequentially input from the state where said current screen is displayed;

a final screen determination means for determining whether the transition destination screen is a final screen, in which screen transition is not performed except to previous screens, when all action information corresponding to identification information of the transition destination screen is acquired from the action rule storing means and any of the acquired information does not include the display process of other screens except for the already-displayed screens after the one screen is displayed, wherein the display process of the transition destination screen is moved ahead of other of the individual screens for display as the final screen;

a display control means for adding the identification information of the said current screen, a first instruction out of the plurality of instructions, and the action rules in association with the action information indicating the process for displaying the transition destination screen to the action rule storing means; and for invalidating the identification information of the said current screen and the action rule including the first instruction by the action rule storing means, on condition that the display frequency of the transition destination screen exceeds a predesignated reference frequency, and the transition destination screen is the final screen, and displaying a menu with icons on the screen display with a touch sensor;

the action rule storing means further comprises:

a performance times count means for further storing the performance times where the processing has been performed according to the action information of the action rules in association with each of the action rules, and when an action rule is partially changed, the performance count is reset to zero, and for incrementing the performance times in association with the action rules including the action information every time the screen display unit performs a process indicated by any of action information;

a high frequency action rule selector for selecting, from among action rules that include identification information for said current screen, a high frequency action rule that is correlated with a performance count equal to or greater than a predesignated reference count in the action rule storing means;

a high frequency screen selector for selecting one of the individual screens that is to be displayed as the final screen by performing a process indicated in the action information included in the high frequency action rule, as having a high frequency display screen that is to be displayed following said current screen and transmits identification information for the high frequency display screen as a selected screen to the display control, wherein the high frequency action rule selector further selects the high frequency action rule for the high frequency display screen from among action rules corresponding to the current season indicated by the season identification information;

the display control means sets the high frequency display screen to be displayed as the final screen following said current screen by the screen display unit to the transition destination screen, on occasion that the transition destination screen is selected as the high frequency display screen by the high frequency screen selector.

2. The display unit according to claim 1, wherein for each of a plurality of screens that are sequentially selected as screens having high display frequencies that are to be displayed following the one screen, when a turn to be displayed following the one screen is later, the high frequency action rule selector employs, as the reference count, a smaller value than when the turn is early, and selects the high frequency action rule that is correlated with a performance count equal to or greater than the performance count.

3. The display device according to claim 1, wherein an invalidated action rule that is regarded as invalid by the display control means is further stored in the action rule storing means in correlation with a different action rule for which identification information and an instruction for a corresponding screen are identical to the invalidated action rule; and upon receiving an instruction to return an action rule to the state before the action rule was changed, the display control means validates the invalidated action rule in the action rule storing means, and invalidates the different action rule that is stored in the action rule storing means in correlation with the invalidated action rule.

4. The display device according to claim 1, wherein when a return instruction to return a display to the previously displayed screen is input while the transition destination screen is being displayed following the one screen, the display control means permits the screen display means to display a screen that was displayed immediately before the last instruction was input.

5. The display device according to claim 4, wherein when a frequency at which the return instruction was input, while the transition destination screen was displayed following the one screen, is equal to or greater than a predesignated reference frequency, for multiple instructions that differ from the plurality of instructions for displaying the transition destination screen, the frequency acquiring means obtains a display frequency at which a different transition destination screen was displayed in response to the last instruction of the multiple instructions; and subject to a condition under which the display frequency of the different transition destination screen exceeds the predesignated reference frequency, the display control means sets a screen that the screen display means displays following the one screen as the different transition destination screen.

6. A car navigation system displaying a next screen responsive to instruction input during a current screen display, comprising:

an action rule storing means for storing, an action rule representing, for each of a plurality of individual screens that can be displayed sequentially by the car navigation system, a correlation of identification information for identifying each of the individual screens, an instruction to be input during display of each of the individual screens and action information indicating a process to be performed when the instruction is input during the screen display wherein, the action rule is stored in correlation with seasons during which the action rule is to be applied;

a season identification information acquiring means for obtaining season identification information for identifying a current season;

a screen display means for, when an instruction is input during display of the current screen, reading, an action rule that corresponds to identification information for said current screen and action information corresponding to the instruction from the action rule storing means, and for performing a process indicated by the action information and for displaying the next screen following the instruction input of said current screen;

a status identification device for obtaining the status of an automobile on which the car navigation system is mounted, wherein the status identification device comprises a device that identifies a driver, identifies a running state of the automobile on which the car navigation system is mounted, identifies a season of a calendar year, and displays congestion information;

a frequency acquiring means for obtaining a display frequency for a transition destination screen based on a number of times the transition destination screen is displayed after the instruction input of said current screen;

a final screen determination means for determining whether the transition destination screen is a final screen to be displayed when all action information corresponding to identification information of the transition destination screen is acquired from the action rule storing means and any of the acquired action information does not include processes to be performed by any other of the individual screens except for the already-displayed screens after the said current screen is displayed and for determining if the final screen to be displayed corresponds to the season indicated by the season identification information; and a display control means for adding the identification information of said current screen, a first instruction out of the plurality of instructions, and the action rules in association with the action information indicating the process for displaying the transition destination screen to the action rule storing means; and for invalidating the identification information of said current screen and the action rule on a condition that the display frequency of the transition destination screen exceeds a reference frequency and the transition destination screen is the final screen, wherein the display process of the transition destination screen moves the transition destination screen ahead of the other individual screens for display as the final screen.

7. The car navigation system according to claim 6, further comprising:

a driver identification means for identifying a driver of an automobile in which the car navigation system is mounted based upon driver identification information, from at least one of: a fingerprint recognition system, the position and angle of the driver's seat, and prerecorded in a key of the automobile, wherein the action rule storing means stores the action rule per driver;

the status of the driver of the automobile is obtained;

the status of the driver is output to a display device;

the screen display means, when an instruction is input during the screen display, reads identification information for the screen and action information corresponding to the instruction from an action rule that corresponds to a driver identified by the driver identifying means, and performs a process indicated by the action information and displays a screen following the one screen;

the frequency acquiring means obtains a display frequency for the transition destination screen for the driver identified by the driver identification means; and subject to a condition under which the display frequency of the transition destination screen exceeds the reference frequency, the display control means additionally stores, for the driver identified by the driver identifying means, an action rule, in the action rule storing means, representing a correlation of the identification information for the one screen, the first instruction and action information indicating a process for displaying the transition destination screen.

8. The car navigation system according to claim 6, wherein said current screen includes an icon with an instruction for selecting a store type is displayed, the frequency acquiring means obtains the display frequency of a transition destination screen displaying a store list of stores in response to an instruction designating a store type, and an instruction designating the name of a company that manages each respective store; and wherein the display frequency of the screen displaying the store list exceeds the reference frequency, the display control means adds action rules in association with the identification information of said current screen, the instruction to select store type and the action information indicating the process displaying a screen of the store list to the action rule storing means.

9. The car navigation system according to claim 6, wherein a reference screen for inputting a destination is displayed, the frequency acquiring means obtains an instruction designating a destination and an instruction designating a route to be traveled by an automobile a display frequency for a transition destination screen indicating congestion information for the route to be traveled; and wherein the display frequency the transition destination screen indicating the congestion information of the route to be traveled exceeds the reference frequency, the display control means adds the action rules in association with identification information of the reference screen for inputting a destination, the instruction designating the destination and action information indicating a process to display the transition destination screen indicating the congestion information of the route to be traveled to the action rule storing means.

10. A display device for displaying a next screen specified with an instruction input during a screen display of a first screen in response to the input of the instruction, comprising:

an action rule storing means for storing multiple action rules for sequentially changing screens representing, for individual screens to be displayed by the display device, correlations of identification information for identifying the screens, instructions to be input during the display of the screens and action information indicating processes to be performed when instructions are input during the display of the screens wherein, the multiple action rules are stored in correlation with seasons during which the action rules are to be applied;

a season identification information acquiring means for obtaining season identification information for identifying a current season;

a performance count means for incrementing performance counts correlated to each of the action rules each time a process indicated by action information is performed;

a screen display means for displaying a next screen of said first screen, by reading identification information of said first screen and action information corresponding to an instruction when the instruction is input during said first screen is displayed, and by executing the process indicated in said action information;

a frequency acquiring means for acquiring a display frequency of a transition destination screen displayed in response to a last instruction out of a plurality of instructions, in the case that said display device sequentially displays a plurality of screens corresponding to the plurality of instructions, which are sequentially input from the state where one screen is displayed, wherein the display frequency is obtained by adding together the performance counts of the action rules associated with the transition destination screen;

a final screen determination means for determining whether the transition destination screen is a final screen when all action information corresponding to identification information of the transition destination screen is acquired from the action rule storing means and any of the acquired information does not include the display process of other screens except for the already-displayed screens after the one screen is displayed and wherein the display frequency of the transition destination screen exceeds a reference frequency, and for determining if the final screen to be displayed corresponds to the season indicated by the season identification information; and a display control means for adding the identification information of the one screen, a first instruction out of the plurality of instructions, and the action rules in association with the action information indicating the process for displaying the transition destination screen to the action rule storing means for invalidating the identification information of the one screen and the action rule including the first instruction by the action rule storing means, and for displaying the transition destination screen based on the determination made by the final screen determination means.

11. The display device according to claim 10, wherein the display control means sets a screen to be displayed following said first screen by the screen display means to the transition destination screen, on further occasion that the transition destination screen is a candidate screen, which is pre-designated as a candidate of screen to be displayed following said first screen.

12. A program stored on a recording medium for controlling a display device for displaying a next screen responsive to instruction input during a current screen display, the program enabling the display device to function as:

an action rule storing means for storing multiple action rules representing, for each of a plurality of individual screens to be displayed by the display device, correlations of identification information for identifying each of the plurality of individual screens, instructions to be input during the display of each of the plurality of individual screens and action information indicating processes to be performed, and storing the number of times the processes are performed, when instructions are input during the display of each of the plurality of individual screens wherein, the multiple action rules are stored in correlation with seasons during which the action rules are to be applied;

a season identification information acquiring means for obtaining season identification information for identifying a current season;

a screen display means for displaying a next screen of said current screen, by reading identification information of a said current screen and an action information corresponding to a specific instruction when the specific instruction is input during display of said current screen, and by executing the process indicated in said action information, and reading information indicating whether one of the individual screens is predesignated as a candidate screen to be displayed following a reference screen;

a frequency acquiring means for acquiring a display frequency of a transition destination screen displayed in response to a last instruction out of a plurality of instructions, in the case that said display unit sequentially displays a plurality of screens corresponding to the plurality of instructions, which are sequentially input from the state where said current screen is displayed;

a final screen determination means for determining whether the transition destination screen is a final screen when all action information corresponding to identification information of the transition destination screen is acquired from the action rule storing means and any of the acquired information does not include the display processes of other screens except for the already-displayed screens after said current screen is displayed and for determining if the final screen to be displayed corresponds to the season indicated by the season identification information; and a display control means for adding the identification information of said current screen, a first instruction out of the plurality of instructions, and the action rules in association with the action information indicating the process for displaying the transition destination screen to the action rule storing means; for invalidating the identification information of the one screen and the action rule including the first instruction by the action rule storing means, on a condition that the display frequency of the transition destination screen exceeds a reference frequency and the transition destination screen is the final screen; and for commanding the screen display means to display the transition destination screen as the final screen.

* * * * *